(12) United States Patent
Carlström

(10) Patent No.: US 6,442,156 B1
(45) Date of Patent: Aug. 27, 2002

(54) METHOD AND DEVICE IN A MOBILE TELECOMMUNICATION NETWORK

(75) Inventor: Tomas Carlström, Hässleholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/163,757

(22) Filed: Sep. 30, 1998

(30) Foreign Application Priority Data

Sep. 30, 1997 (SE) .............................................. 9703538

(51) Int. Cl.[7] .................................................. H04J 3/16
(52) U.S. Cl. ....................................................... 370/343
(58) Field of Search ................................ 370/343, 311, 370/464, 465, 480, 461, 462, 351, 352, 395, 401, 341, 347, 337, 319, 320, 321, 312, 411, 342, 338, 333, 332; 455/3.04, 3.05, 422, 428, 450, 63, 560, 561

(56) References Cited

U.S. PATENT DOCUMENTS

| | | | |
|---|---|---|---|
| 5,446,739 A | | 8/1995 | Nakano et al. |
| 5,448,750 A | | 9/1995 | Eriksson et al. |
| 5,570,355 A | * | 10/1996 | Dail et al. |
| 5,953,344 A | * | 9/1999 | Dail et al. |

FOREIGN PATENT DOCUMENTS

| | | |
|---|---|---|
| WO | 95/31878 | 11/1995 |
| WO | 96/10320 | 4/1996 |

* cited by examiner

*Primary Examiner*—Dang Ton
(74) *Attorney, Agent, or Firm*—Burns, Doane, Swecker & Mathis, L.L.P.

(57) ABSTRACT

A method and an apparatus for allocating channels to multislot connections in a mobile telecommunication network are disclosed. The method includes the steps of sorting all available channels into Multislot Resource Groups (RGs), then selecting one of the RGs fulfilling the following requirements:

- at least the requested number of idle channels are identified,
- fulfilling the requirements of the mobile class of the mobile terminal concerned,
- as few idle channels as possible above the requested number of channels,
- belonging to the least adaptable TCH capabilities group,
- following the selected strategy for the non-hopping TCHs on the BCCH frequency,
- having the lowest interference, and
- if frequency hopping is used, hopping over as many frequencies as possible.

14 Claims, 4 Drawing Sheets

| TB | Encrypted bits | Flag | Training sequence | Flag | Encrypted bits | TB |

FIG. 3A

| TB | Fixed bits | TB |

FIG. 3B

| TB | Encrypted bits | Synchronization sequence | Encrypted bits | TB |

FIG. 3C

| TB | Synchronization sequence | Encrypted bits | TB |

FIG. 3D

| TB | Mixed bits | Training sequence | Mixed bits | TB |

FIG. 3E

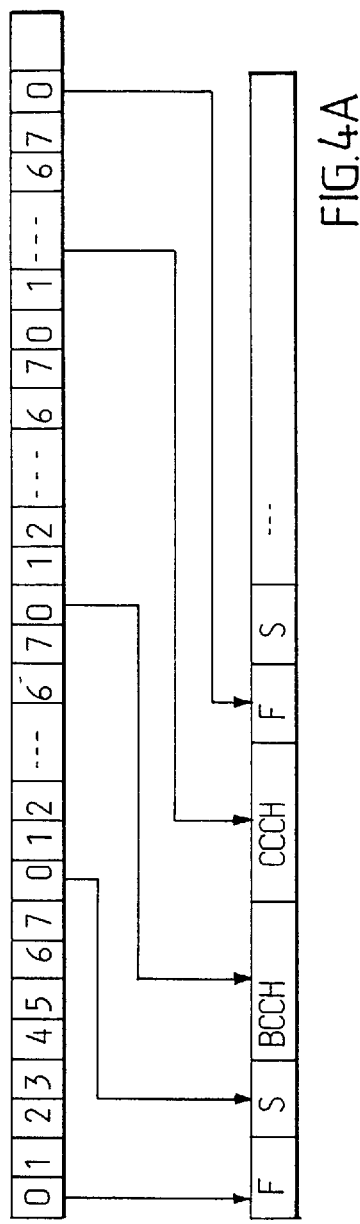

METHOD AND DEVICE IN A MOBILE TELECOMMUNICATION NETWORK

TECHNICAL FIELD

The present invention relates to the field of mobile communication between a base station and a mobile terminal, and in particular to connections with high transmission rates in a Time Division Multiplex Access (TDMA) system, such as the GSM system.

BACKGROUND

In a TDMA system, communication between the base station and a mobile terminal takes place in channels. A number of channels are transmitted on one carrier frequency using time division multiplex. The transmission on each carrier frequency takes place in time slots, and each physical channel occupies one time slot. As an example, in GSM, eight physical channels at a time may share the same carrier frequency, that is, eight time slots constitute one frame. One traffic channel (TCH) occupies one physical channel, and one connection usually involves one TCH. In this way, all connections are transferred at the same maximum bit rate. At present, the maximum bit rate is 9.6 kbit/s for payload information.

According to the GSM standard, frequency hopping may be used, that is, at regular intervals the carrier frequency is changed, to minimize the effects of multipath fading and the disturbances between the channels.

High Speed Circuit Switched Data (HSCSD) has been introduced in the GSM standard to enable connections with higher transmission rates. HSCSD connections use a multislot configuration of channels for transmitting data, that is, one connection is allowed to occupy more than one channel, that is, more than one time slot in each frame. The network architecture to support HSCSD allows a maximum of eight independent full rate traffic channels to be used for one connection, to achieve a bit rate eight times higher than the normal bit rate.

Different mobile terminals are capable of handling different numbers of channels. The maximum number of uplink channels and downlink channels, respectively, and the total maximum number of channels may be restricted. In the GSM standard, 18 different mobile classes have been defined, specifying the number of channels that a mobile terminal is able to handle. Other restrictions are also specified; for example some mobile terminals can only handle consecutive channels in a multislot connection, whereas others can handle any combination of channels. The simplest mobile class only handles one uplink channel and one downlink channel. The most advanced mobile class handles up to eight channels in each direction, and any combination of channels may be used.

The GSM standard states that all channels to be allocated to one mobile connection in a multislot configuration must have the same Training Sequence Code (TSC), Hopping Sequence Number (HSN), Mobile Allocation (MA) and Mobile Allocation Index Offset (MAIO), if frequency hopping is used. If frequency hopping is not used, all channels used in the same multislot configuration must have the same TSC and Absolute Radio Frequency Channel (ARFCN). This means that all channels in a multislot configuration transmit and receive on the same frequencies at the same time, with the same TSC, even when frequency hopping is used.

According to the GSM standard, different speech versions may be used, in dependence of the type of mobile terminal used. Version I full rate was the original speech version and is still used by some mobile terminals. Later, Version II, enhanced full rate and half rate have been added. Different channels support different speech version. One channel may support only one speech version or several different ones, depending on the network equipment used.

For standard connections occupying one channel, algorithms have been disclosed for allocating one channel to one connection. For example, U.S. Pat. No. 5,448,750 discloses a method for dynamic channel allocation. Channels are ranked in a priority list according to their performance in previous connections.

There is, however, no way of allocating more than one channel to a connection in a suitable way. If a connection requires the use of more than one channel, normally a known algorithm for assigning one channel is used. If there are other idle channels on fulfilling the requirements for a multislot connection, that is, transmitting on the same frequency and with the same frequency hopping pattern, these channels may then be used for a multislot connection. Depending on the mobile terminal used, the channels used in a multislot connection may have to occupy consecutive time slots in a frame, which also cannot be ensured with known methods. Thus, there is virtually no way of ensuring that the desired number of additional channels can be added.

In most mobile telephony systems, channel spacing is used, that is, the uplink carrier frequency and the downlink frequency used in a connection are always at a specified distance from each other. When a carrier frequency has been selected for one direction, the carrier frequency to be used in the other direction is given. Thus, when high transmission rates are desired in both directions, it must be ensured that the desired number of channels are available on both the uplink and the downlink carrier frequencies.

Ideally the allocation of multislot connections should fulfil the requirements listed below:

The maximum radio interface data rate should be as high as possible.

The idle channels should be selected in such a way that the chance of establishing subsequent multislot channels is maximized.

The idle channels should be selected in such a way as to allow allocation of suitable channels to subsequently requested speech connections. Therefore, the channels supporting the largest number of speech versions should be left idle if possible.

The idle channels should be selected according to the strategy preferred by the operator regarding non-hopping TCHs on the BCCH frequency.

Channels with low interference should be selected.

The channels should be selected in such a way as to minimize the impact of interference and multipath fading in the system, by using frequency hopping in an efficient way.

The channel allocation algorithm should be fast.

The channels should be selected in such a way as to allow the desired number of channels in the uplink direction and the downlink direction.

SUMMARY OF THE INVENTION

It is an object of the present invention to define a way to select and allocate channels for multislot connections of the desired capacity.

It is another object of the invention to allocate channels to multislot connections in such a way as to minimize the interference between the connections.

It is yet another object to decrease the time needed for channel allocation in multislot configurations compared to the prior art solutions.

It is still another object to achieve a method fulfilling the requirements listed above.

These objects are achieved according to the present invention by a method for the allocation of channels to a high transmission rate connection between a base station and a mobile terminal in a mobile telecommunication network, said high transmission rate connection being achieved by allowing one connection to occupy more than one physical channel, said method comprising the following steps:

Sorting all channels that may be used for transmitting traffic in the mobile network into groups, each group comprising all channels that are allocatable to one connection in the network;

When requesting a connection, specifying a number of channels desired for the connection;

Selecting a suitable group for the connection.

To refine the selection, the method may comprise the following additional steps:

identifying the mobile class of the mobile terminal that is to take part in the connection.

identifier the groups that have at least the desired number of idle channels.

if no groups have at least the desired number of idle channels, identifying the groups having the highest number of idle channels.

identifying the groups having the lowest number of idle channels above the desired number of channels.

identifying the groups from the least adaptable TCH capabilities group.

identifying the groups having the lowest interference level.

identifying the groups following the selected strategy for assigning the traffic channels on the BCCH frequency.

identifying the groups hopping over the largest number of frequencies.

The method according to the invention may be performed for downlink channels, uplink channels or both.

A network allocation node for use in a mobile telecommunication network is also disclosed, said node comprising:

a list of all groups of channels that can be used together for a connection between a base station and a mobile terminal, means for carrying out the inventive method.

The invention offers the following advantages:

The highest possible total radio interface transmission rate is achieved for each connection set up according to the invention.

The probability of success in achieving high transmission rates for multislot channel allocations is increased compared to the prior art solutions.

The probability of allocating channels supporting the requested speech version for further speech connections is increased compared to the prior art solutions.

The idle channels may be selected to minimize multipath fading and achieve interference averaging when multislot configurations are allocated, giving an improved and more uniform speech quality and enabling a shorter frequency reuse distance.

BRIEF DESCRIPTION OF THE DRAWINGS

FIGS. 3A–3E show, somewhat simplified, the different signal formats used in a GSM system, FIG. 4 shows the principles for the downlink control signalling according to the GSM protocols.

DETAILED DESCRIPTION OF EMBODIMENTS

Figure 1:
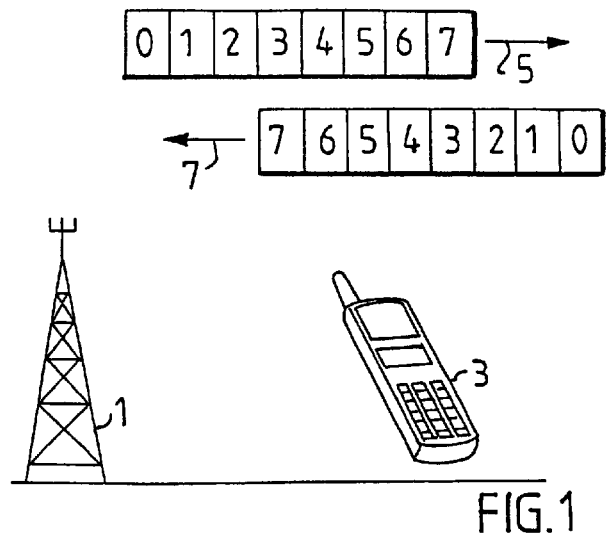
FIG. 1 shows the signalling principle between a base station and a mobile terminal according to TDMA.

FIG. 1 shows the transmission between a base station 1 and a mobile terminal 3 in a mobile telephone network. A number of channels, usually eight, share the same carrier frequency by means of time division multiplexing.

The transmission direction from the base station 1 to the mobile terminal 3 is referred to as the downlink, or forward, direction and is indicated by an arrow 5. The transmission direction from the mobile terminal 3 to the base station 1 is referred to as the uplink, or reverse, direction and is indicated by an arrow 7.

Normally, different frequency bands are used for downlink and uplink transmission. This is referred to as Frequency Division Duplex (FDD). Time Division Duplex (TDD), in which the same frequencies are used in both directions but at different times, is rarely used.

Figure 2:
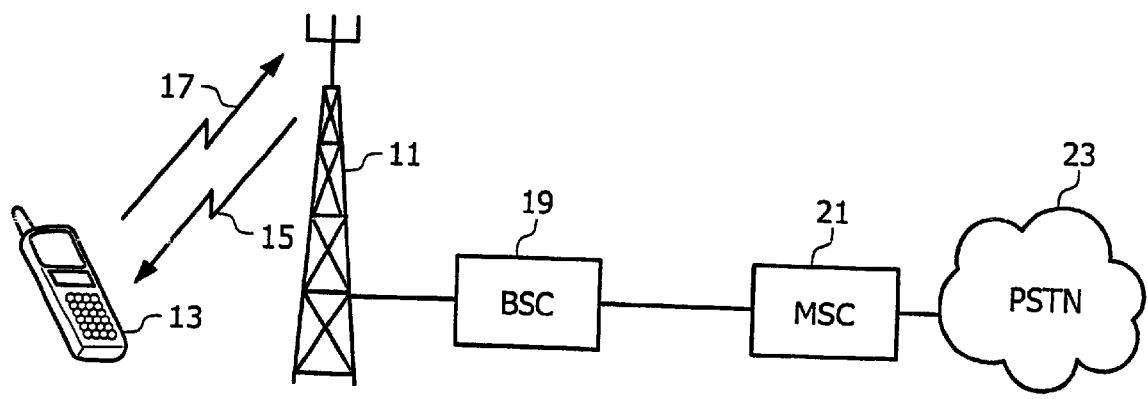
FIG. 2 shows the basic building blocks of a mobile telephony network.

FIG. 2 shows the basic building blocks of a mobile telecommunication network. As in FIG. 1, there is a base station 11 communicating with a mobile terminal 13. The downlink direction is indicated by an arrow 15 and the uplink direction is indicated by an arrow 17. The base station 11 is connected to a Base Station Controller (BSC) 19, which primarily controls the radio network. Its most important task is to ensure the efficient use of the resources in the mobile network. Several base stations may be connected to one BSC.

The BSC 19 is connected to a Mobile Switching Centre (MSC) 21, which performs all switching functions related to call processing in the mobile network. The MSC 21 is typically connected to a Public Services Telephone Network (PSTN) 23, and to other telecommunication networks, as common in the art.

The BSC performs the following functions:

Allocation of network resources, such as radio channels,

Administration of cell description data and cell configuration data, such as Cell Global Identity (CGI), Base Station Identity Code (BSIC) and BCCH number, Administration of system information data and locating data Traffic and event measurements, such as measurements of the number of call attempts, congestion, number of handovers, etc.

Measurements on idle channels, for example to enable the allocation of the channel with the lowest interference for a call, Traffic recordings, to trace events during a call, for example, to detect malfunction in the network.

As will be obvious to the skilled person, these functions may be implemented in different ways, and not necessarily in the same unit. Also, the BSC and the MSC functions may be implemented in one unit. The functions important to this invention are primarily the resource allocation functions.

According to the invention, the list of all the multislot RGs available is stored in the BSC 19. The BSC 19 also comprises means for selecting the appropriate multislot RG for a requested connection. The selection is carried out according to the method described in connection with FIG. 5.

Signalling in TDMA Systems

In a TDMA system, each carrier frequency is divided into a number of time slots. In this example, as shown in FIG. 1, there are eight time slots, TS0, TS1, . . . , TS7. These eight time slots make up one TDMA frame, as shown in FIG. 1. 26 or 51 frames make up one multiframe. The same time slot in a sequence of frames, e.g. time slot 0 in all the frames, is referred to as a physical channel.

One physical channel may be used, at different times, for transmission of different logical channels. Logical channels may be either traffic channels carrying payload or control channels carrying different kinds of control information. One telephone call uses one physical channel for transmission in each direction for the duration of the talk.

The information on the control channels is carried in bursts. A burst comprises the information in the same time slot in a sequence of frames of predefined length. The different types of bursts are shown, somewhat simplified, in FIGS. 3A–3E.

FIG. 3A shows the normal burst, which is used to carry information on traffic channels and on certain control channels, such as BCCH and PCH. The first eight bits are tail bits TB, which signify a start point. The following bit sequence carries encrypted data or speech. Then follows a Training Sequence Code (TSC), that is, a specified bit pattern used by the equalizer to create a channel mode and another sequence of encrypted data or speech. The last eight bits are again tail bits TB, this time signifying a stop point. The tail bits are always set to 0, 0, 0.

FIG. 3B shows the frequency correction burst, which is used for frequency synchronization of the mobile terminal. Eight tail bits TB are followed by a sequence of fixed bits and eight more tail bits TB.

FIG. 3C shows the synchronization burst, which is used for the time synchronization of the mobile terminal. It contains eight tail bits TB, a sequence of encrypted bits, a long synchronization sequence another sequence of encrypted bits and eight more tail bits. The encrypted sequences carry the information of the TDMA Frame Number (FN) and Base Station Identity Code (BSIC).

FIG. 3D shows the access burst, which is used for uplink signalling at random access and handover access. The access burst comprises eight tail bits TB followed by a synchronization sequence, a sequence of encrypted bits and eight more tail bits TB.

FIG. 3E shows the dummy burst, which is transmitted on the BCCH carrier frequency when no other information is to be transmitted on this frequency. Eight tail bits TB are followed by a sequence of mixed bits, a TSC, another sequence of mixed bits and eight more tail bits TB. The dummy burst carries no information.

The logical channels relevant to the invention are as follows:

The Broadcast Control Channel (BCCH) and the Paging Channel (PCH) are transmitted as normal bursts, as shown in FIG. 3A. BCCH comprises general information about the cell, and PCH is used to page a mobile terminal.

In idle mode, the downlink transmission, that is, from the base station to the mobile terminal, normally comprises normal bursts (BCCH and PCH), frequency correction bursts (FCCH), synchronization bursts (SCH) and dummy bursts.

A mobile terminal is normally only capable of transmitting normal bursts and access bursts.

Two control channels that are of relevance to the present invention are the Fast Associated Control Channel (FACCH) and the Slow Associated Control Channel (SACCH). The FACCH is used for the signalling in connection with handover, that is, when a connection between a mobile terminal and a base station moves to another base station. The SACCH is used for uplink transmission of measurements of signal strength and quality and for downlink transmission of system information such as the transmitting power to be used.

Only one of the physical channels used in a multislot connection carries an FACCH, handling the FACCH signalling for all the physical channels included in the multislot connection. The channel carrying the FACCH is called the Main Channel. The Slow Associated Control Channel (SACCH) associated with it is called the Main SACCH. The Main Channel carries the main signalling link used for the downlink signalling.

The following new channel combinations are included for HSCSD:

TCH/F+FACCH/F+SACCH/M (Main Channel)
TCH/F+SACCH/M (Bi-directional Channel)
TCH/FD+SACCH/MD (Uni-directional Channel)

The suffix F indicates full rate transmission, and FD indicates full rate transmission in the downlink direction only. The suffix M indicates a multislot configuration, and MD indicates a multislot configuration in the downlink direction only.

FIG. 4A shows the principles for the downlink control signalling that takes place in time slot 0 of channel $C_0$ according to the GSM protocols. The physical channel defined by this time slot comprises the following channels: FCCH, SCH, BCCH, as defined above, and the Common Control Channel (CCCH), which comprises the PCH.

FIG. 4B shows the mapping of the control channels FCCH, SCH, BCCH and CCCH in a non-combined cell in GSM, as an example of a TDMA system. An FCCH frame is followed by an SCH frame, four BCCH frames and four CCCH frames. Then, the following pattern occurs four times: One FCCH frame, one SCH frame, four BCCH frames and four CCCH frames. The sequence ends with an idle frame.

On all channels except the BCCH and the channels transmitting on the same frequency as the BCCH, frequency hopping is used. The BCCH channel, which is used for transmitting broadcast messages, uses a higher transmit power than the other channels. Some network operators find it desirable that the traffic channels on the BCCH frequency, for which frequency hopping is not used, are allocated first. Others prefer these traffic channels to be allocated last, and others again have no preference.

To make the process of allocating channels for multislot configurations as fast as possible, the available channels are sorted into Multislot Resource Groups (RGs). Channels belonging to the same Multislot RG can be allocated to the same mobile terminal in a mulfislot configuration. All channels that can be used together for a multislot connection are grouped together. For GSM this means that all channels transmitting on the same frequency, with the same frequency hopping pattern and having the same TSC, are put in one group. Hence, a multislot RG in GSM may comprise a maximum of eight channels.

All channels that are available for multislot traffic are automatically sorted into multislot RGs. The multislot RGs may comprise the downlink channels of one frequency, and the uplink channels of the corresponding uplink frequency, or only downlink channels or uplink channels. When channel allocation is to be performed, the sorted list can be used, which will reduce the time needed for channel allocation. Normally, the list is stored in a telephone exchange known as a Base Station Controller (BSC). The BSC also controls the selection of Multislot RGs.

The traffic channels may have different traffic channel capabilities, that is, the channel rate and speech version may vary. A traffic channel capabilities group is a group of physical channels supporting the same traffic channel capabilities. For example, a group could consist of the traffic channels supporting full rate, speech full rate version 1 and another group could consist of the traffic channels supporting full rate, speech full rate version 2.

A traffic channel capabilities group may support several different traffic channel capabilities. The least adaptable traffic channel capabilities group is the group that supports the fewest different channel rates and speech versions. It is desirable to select the least adaptable traffic channel for a new connection, to keep the maximum flexibility for subsequent connections in the system.

Figure 5:
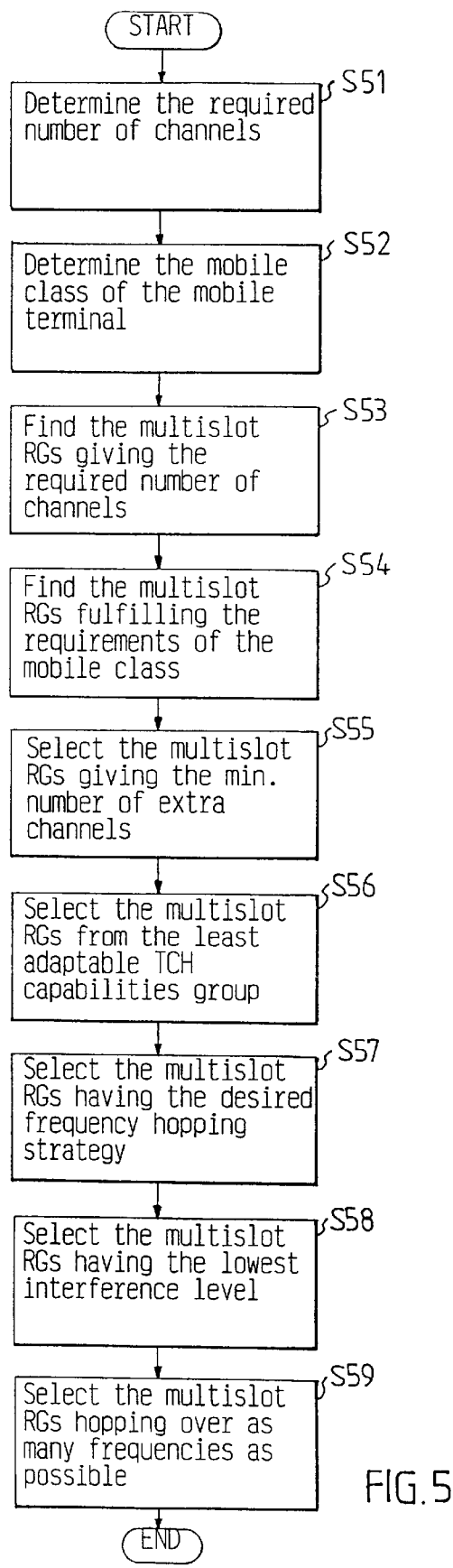
FIG. 5 is a flow chart of the procedure for allocating a downlink multislot connection according to the invention.

FIG. 5 shows the method used for channel allocation according to the invention, when a higher transmission rate is desired.

Step S51: The number of channels needed to achieve the desired total radio interface data rate is determined. This is the requested number of channels. Downlink channels or uplink channels, or both, may be specified.

Step S52: The mobile class of the mobile terminal that is to take part in the connection is determined.

Step S53: The multislot RGs having at least the requested number of idle channels are identified.

Step S54: Among the multislot RGs identified in step S53, the multislot RGs for which it is possible to allocate at least the requested number of idle channels, considering the requirements of the mobile class found in step S52, are identified.

Step S55: Among the multislot RGs identified in step S54, the multislot RGs having the lowest number of idle channels above the requested number of channels are identified.

Step S56: Among the multislot RGs identified in step S55, the multislot RGs from the least adaptable TCH capabilities group are identified using the average of the TCH capabilities group values for all available channels for each multislot RG.

Step S57: Among the multislot RGs identified in step S56, the multislot RGs that follow the selected strategy for the non-hopping TCHs on the BCCH frequency are identified. This strategy defines whether the TCHs on the BCCH frequency, which do not use frequency hopping, are to allocated first or last, or if no preference has been stated.

Step S58: Among the multislot RGs identified in step S57, the ones having the lowest interference are identified. Idle channel measurements are used to determine the interference levels. The measurements may be carried out in different ways. In the simplest case, only the channel having the poorest interference value of all available channels for each multislot RG is taken into account. It would also be possible to calculate an average value for all channels. This would give a better result but would also require a greater capacity for calculations.

Step S59: Among the multislot RGs identified in step S58, the multislot RGs hopping over as many frequencies as possible are identified, if frequency hopping is used.

If a multislot connection is requested in both directions and no multislot RG is found to satisfy the requirements regarding both the uplink and the downlink channels, the system may attempt to optimize the selection according to one of the following rules:

With regard to uplink channels,

With regard to downlink channels,

With regard to both uplink and downlink channels.

Alternatively, if all requirements cannot be fulfilled, the connection may not be set up.

For example, if no multislot RG is found to have at least the requested number of idle channels in both the uplink and the downlink directions, the system may respond in a number of different ways, for example:

The multislot RG having the requested number of idle channels in one of the directions is selected (assuming multislot connections have been requested in both the uplink and the downlink direction)

The multislot RG having the largest total number of idle channels is selected,

The connection is not set up.

The procedure shown in FIG. 5 applies certain criteria for the selection of a multislot RG. As will be obvious to the skilled person, the steps may be carried out in any order, starting with the step considered most important. Therefore, the order of the steps may be changed as desired. Also, steps not considered important may be omitted. For example, if there is no preference as to the allocation of traffic channels on the BCCH frequency, step S57 may be omitted.

If only one multislot RG remains after any one of the steps in FIG. 5, this multislot RG is selected for the requested connection, regardless of whether or not it fulfils the remaining criteria. Alternatively, if no mulfislot RG fulfils all the criteria, the connection may be refused.

If no multislot RG remains after any of the steps, one of the mulfislot RGs identified in the previous step may be selected in a random way.

If more than one mulfislot RG remains after step S57, any one of these multislot RGs may be selected for the requested connection. The selection may therefore be made in a random way.

What is claimed is:

1. A method for allocating channels to a high transmission rate connection between a base station and a mobile terminal in a mobile telecommunication network, the high transmission rate connection being achieved by allowing one connection to occupy more than one physical channel, the method comprising the following steps:

sorting all channels that may be used for transmitting traffic in the mobile network into groups, each group comprising all channels that are allocatable to one connection in the network;

when requesting a connection, specifying a number of channels desired for the connection;

selecting a suitable group for the connection.

2. The method of claim 1, further comprising the step of identifying a mobile class of the mobile terminal that is to take part in the connection.

3. The method of claim 1, further comprising the step of identifying groups that have at least the desired number of idle channels.

4. The method of claim 3, further comprising the step of, if no groups have at least the desired number of idle channels, identifying groups having the highest number of idle channels.

5. The method of claim 1, further comprising the step of identifying groups having the lowest number of idle channels above the desired number of channels.

6. The method of claim 1, further comprising the step of identifying groups from a least adaptable TCH capabilities group.

7. The method of claim 1, further comprising the step of identifying groups having the lowest interference level.

8. The method of claim 1, further comprising the step of identifying groups following a strategy selected for assigning the traffic channels on the BCCH frequency.

9. The method of claim 1, further comprising the step of identifying groups hopping over the largest number of frequencies.

10. The method of claim 1, wherein channel allocation is performed with regard to the downlink channels or the uplink channels.

11. The method of claim 1, wherein channel allocation is performed with regard to both uplink and downlink channels.

12. The method of claim 11, wherein if all allocation criteria cannot be met, the channel allocation is optimized with regard to the uplink channels, or with regard to the downlink channels.

13. The method of claim 11, wherein if all allocation criteria cannot be met, the channel allocation is optimized with regard to the entire connection.

14. A node for allocating network resources in a mobile telecommunication network, comprising:
   a list of all groups of channels that can be used together for a connection between a base station and a mobile terminal; and
   means for allocating channels to a high transmission rate connection by allowing the connection to occupy more than one physical channel, the means for allocating channels including
      means for sorting all channels that may be used for transmitting traffic in the mobile network into groups, each group comprising all channels that are allocatable to the connection in the network;
      means for specifying a number of channels desired for the connection when requesting a connection; and
      means for selecting a suitable group for the connection.

* * * * *